(12) United States Patent
Kim

(10) Patent No.: US 11,745,804 B2
(45) Date of Patent: Sep. 5, 2023

(54) FRONT VEHICLE BODY STRUCTURE

(71) Applicants: Hyundai Motor Company, Seoul (KR); Kia Motors Corporation, Seoul (KR)

(72) Inventor: Eonpyo Kim, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 312 days.

(21) Appl. No.: 17/159,049

(22) Filed: Jan. 26, 2021

(65) Prior Publication Data
US 2022/0048576 A1 Feb. 17, 2022

(30) Foreign Application Priority Data

Aug. 13, 2020 (KR) .................. 10-2020-0101494

(51) Int. Cl.
| | |
|---|---|
| *B62D 25/08* | (2006.01) |
| *H01M 50/244* | (2021.01) |
| *H01M 50/249* | (2021.01) |
| *H01M 50/264* | (2021.01) |
| *B62D 25/14* | (2006.01) |
| *B62D 27/06* | (2006.01) |
| *B62D 27/02* | (2006.01) |

(52) U.S. Cl.
CPC .......... *B62D 25/08* (2013.01); *H01M 50/244* (2021.01); *H01M 50/249* (2021.01); *B60Y 2304/07* (2013.01); *B60Y 2410/124* (2013.01); *B62D 25/082* (2013.01); *B62D 25/085* (2013.01); *B62D 25/145* (2013.01); *B62D 27/023* (2013.01); *B62D 27/065* (2013.01); *H01M 50/264* (2021.01); *H01M 2220/20* (2013.01); *Y02E 60/10* (2013.01)

(58) Field of Classification Search
CPC .... B62D 25/08; B62D 27/065; B62D 25/082; B62D 27/023; B62D 25/145; B62D 25/085; H01M 50/244; H01M 50/249; H01M 2220/20; H01M 50/264; Y02E 60/10; B60Y 2304/07; B60Y 2410/124
USPC .................................................... 296/187.09
See application file for complete search history.

(56) References Cited

U.S. PATENT DOCUMENTS

| | | | |
|---|---|---|---|
| 9,132,794 B2 * | 9/2015 | Nagaya ................... | B60R 19/18 |
| 2019/0126989 A1 * | 5/2019 | Okura ..................... | B62D 25/08 |

* cited by examiner

*Primary Examiner* — Joseph D. Pape
*Assistant Examiner* — Dana D Ivey
(74) *Attorney, Agent, or Firm* — MORGAN, LEWIS & BOCKIUS LLP

(57) ABSTRACT

A front vehicle-body structure may include a pair of front side members each disposed in a vehicle length direction at both sides of a front vehicle-body, a pair of mounting brackets each engaged with a corresponding front side member among the pair of front side members and disposed to protrude from an internal panel of the corresponding front side member in a width direction of the vehicle to face each other, a cross bar having an upper surface, a front surface, and a rear surface, having a cross-section having an open bottom side and an open lateral end portion, and engaged with the mounting bracket in a vehicle height direction thereof, and an engagement unit of engaging the cross bar to the pair of mounting brackets with a predetermined gap between the pair of front side members and the lateral end portion of the cross bar.

19 Claims, 15 Drawing Sheets

FRONT VEHICLE BODY STRUCTURE

CROSS-REFERENCE TO RELATED APPLICATION

The present application claims priority to Korean Patent Application No. 10-2020-0101494 filed on Aug. 13, 2020, the entire contents of which is incorporated herein for all purposes by this reference.

BACKGROUND OF THE INVENTION

Field of the Invention

The present invention relates to a vehicle body structure.

Description of Related Art

In general, an electric vehicle disposes various structures, such as a front trunk structure and a high voltage electric unit, on a front vehicle-body. The front vehicle-body of such an electric vehicle is mounted with a front cross bar for enhancing collision stability as well as mounting various structures.

The front cross bar connects internal sides of front side members in a width direction of the vehicle. For example, the front cross bar is provided with an aluminum extruded material with a circular or rectangular closed cross-section and is directly engaged with the front side members.

Here, in the case of applying a front cross bar with a circular closed cross-section, end portions of the cross bar are squeezed and the squeezed portions are directly engaged to the front side members by bolting. In the case of applying a front cross bar with a rectangular closed cross-section, end portions of the cross bar are directly engaged with the front side members by bolts.

Conventionally, the front cross bar is assembled to the front side member, prior to assembling various assembly components to the front vehicle-body. This is because interference between the assembly components and the fastening tool may occur when the front cross bar is assembled to the front side member after the assembly components are assembled on the front vehicle-body.

However, in the case of assembling the front cross bar to the front side member before assembling the assembly components to the front vehicle-body, it may cause inconvenience of the worker's movement line and working posture by the front cross bar.

On the other hand, conventionally, when the aluminum extruded material having a circular or rectangular closed cross-section is applied as a front cross bar, it is disadvantageous in terms of cost.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a front vehicle-body structure which may include a pair of front side members each mounted in a vehicle length direction at both sides of a front vehicle-body, a pair of mounting brackets each engaged with a corresponding front side member among the pair of front side members and mounted to protrude from an internal panel of the corresponding front side member in a width direction of the vehicle to face each other, a cross bar having an upper surface, a front surface, and a rear surface, having a cross-section having an open bottom side and an open lateral end portion, and engaged with the mounting bracket in a vehicle height direction thereof, and an engagement unit of engaging the cross bar to the pair of mounting brackets with a predetermined gap between the pair of front side members and the lateral end portion of the cross bar.

An exemplary front vehicle-body structure may include may further include a guide stud which is fixed to an upper surface of the pair of mounting brackets in the height direction of the vehicle and configured to be coupled to a guide hole provided on the upper surface of the cross bar, in the height direction of the vehicle.

Each of the pair of mounting brackets may include an upper surface, a front surface, a rear surface, a lower surface, and side surfaces, where the side surfaces of the mounting brackets face each other. The mounting bracket may be conjoined to an internal upper surface and an internal side surface of the front side member.

The mounting bracket may include an upper surface portion, a first bent surface portion bent downwardly from forward and rearward sides of the upper surface portion, a side surface portion bent downwardly from a first side of the upper surface portion, a lower surface portion formed by bending the side surface portion in the width direction of the vehicle, to correspond to the upper surface portion, and a second bent surface portion formed by bending upward at forward and rearward sides of the lower surface portion, and partially overlaps with the first bent surface portion.

The mounting bracket may include a first junction flange extending forward and rearward from a second side of the upper surface portion, and conjoined to an internal upper surface of the front side member, a second junction flange bent forward and rearward from the second bent surface portion, and conjoined to the internal side surface of the front side member, and a third junction flange bent downwardly from the lower surface portion, and conjoined to the internal side surface of the front side member.

The first junction flange may be spot-welded to the internal upper surface of the front side member.

The second and third junction flanges may be spot-welded to the internal side surface of the front side member.

The first bent surface portion and the second bent surface portion partially may overlap with each other, and may form the front surface and the rear surface of the mounting bracket.

The side surface portion may include a reinforcement rib which may be formed by bending forward and rearward sides of the side surface portion toward the first bent surface portion along the width direction of the vehicle, and overlaps with the first bent surface portion.

The mounting bracket may form a closed section of which a cross-section gradually decreases from one front side member toward an opposite front side member.

The cross bar may be formed in a cross-section form having an open bottom side thereof.

The cross bar may form round portions bent to be round in an outward direction at bottom portions of the front and rear surfaces.

The engagement unit may include an engagement hole formed on an upper surface of the mounting bracket, and a weld nut conjoined to an edge portion of the engagement hole from an internal side of the mounting bracket.

Both end portions of the cross bar may be respectively formed with a bolt engagement hole aligned with the weld nut through the engagement hole.

The front vehicle-body structure may be configured to mount a vehicle component for an electric vehicle to the cross bar, wherein the vehicle component for the electric vehicle includes a wiring harness, a high voltage electric unit, and a front trunk structure.

Another exemplary front vehicle-body structure may include a pair of front side members each disposed in a vehicle length direction at both sides of a front vehicle-body, a pair of first mounting brackets each engaged with a corresponding front side member among the pair of front side members and disposed to protrude from an internal panel of the corresponding front side member in a width direction of the vehicle to face each other, a cross bar having an upper surface, a front surface, and a rear surface, having a cross-section having an open bottom side and an open lateral end portion, and engaged with the first mounting bracket in a vehicle height direction thereof, a first engagement unit provided on an upper surface of the first mounting bracket and configured to engage the cross bar to the mounting bracket with a predetermined gap between the pair of front side members and the lateral end portion of the cross bar, a second engagement unit provided on the first mounting bracket to mount a vehicle component to the cross bar by being engaged with the vehicle component, a second mounting bracket which is engaged with the front side member with a predetermined gap in the vehicle length direction with respect to the first mounting bracket, and protrudes from the internal panel of the front side member in the width direction of the vehicle, and a third engagement unit provided on the second mounting bracket to mount the vehicle component to the cross bar by being engaged with the vehicle component.

The vehicle component may include a battery assembly including a battery tray and an auxiliary battery. The battery assembly may be mounted to the cross bar through the second and third engagement units.

The first engagement unit may include a first engagement hole formed on the upper surface of the first mounting bracket, and a first weld nut conjoined to an edge portion of the first engagement hole from an internal side of the first mounting bracket, and aligned with a bolt engagement hole provided in the cross bar through the first engagement hole.

The second engagement unit may include a second engagement hole formed on an upper surface of the first mounting bracket, and a second weld nut conjoined to an edge portion of the second engagement hole from an internal side of the first mounting bracket, and configured to be aligned with a bolt engagement hole provided in the vehicle component through the second engagement hole.

The third engagement unit may include a third engagement hole formed on an upper surface of the second mounting bracket, and a third weld nut conjoined to an edge portion of the third engagement hole from an internal side of the second mounting bracket, and configured to be aligned with a bolt engagement hole provided in the vehicle component through the third engagement hole.

The exemplary front vehicle-body structure may further include a fourth engagement unit provided in the front side member to mount the vehicle component to the cross bar and configured to be engaged with the vehicle component.

The fourth engagement unit may include a fourth engagement hole formed on an internal upper surface of the front side member, and a fourth weld nut conjoined to edge portion of the fourth engagement hole from an internal side of the front side member, and configured to be aligned with a bolt engagement hole provided in the vehicle component through the fourth engagement hole.

Other effects which may be obtained or are predicted by an exemplary embodiment will be explicitly or implicitly described in a detailed description of the present invention. That is, various effects that are predicted according to an exemplary embodiment will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The drawings are intended to be used as references for describing the exemplary embodiments of the present invention, and the accompanying drawings may not be construed as limiting the technical spirit of the present invention.

Figure 1:
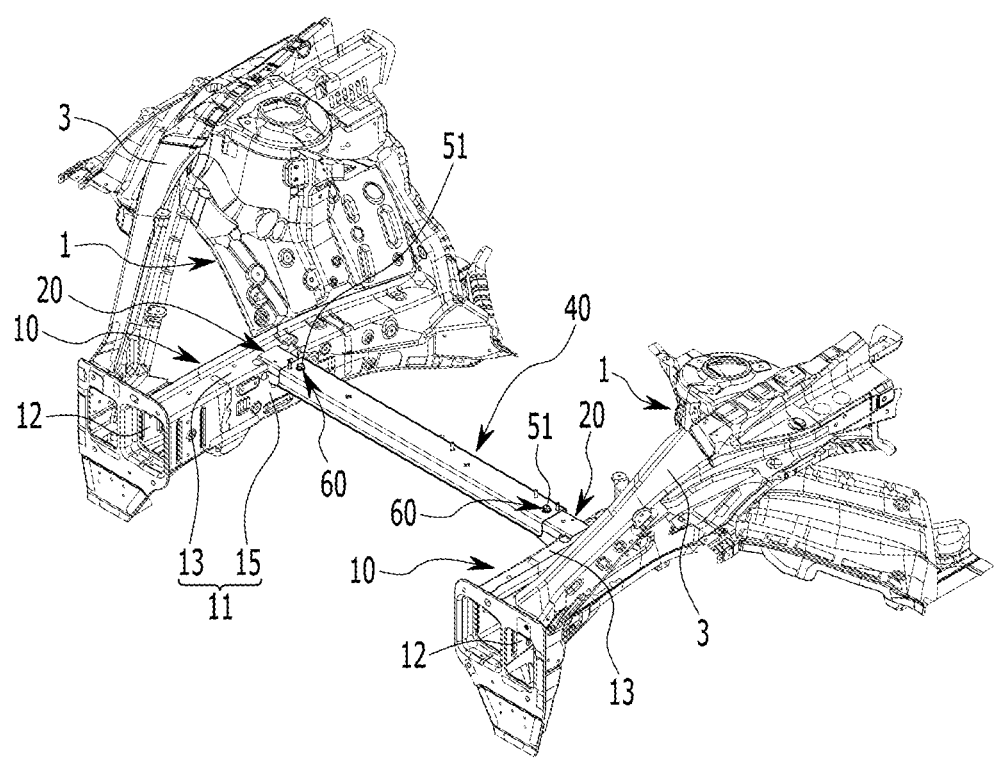
FIG. 1 is a perspective view of a front vehicle-body structure according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

To clarify the present invention, parts that are not related to the description will be omitted, and the same elements or equivalents are referred to with the same reference numerals throughout the specification.

Also, the size and thickness of each element are arbitrarily shown in the drawings, but the present invention is not necessarily limited thereto, and in the drawings, the thickness of layers, films, panels, regions, etc., are exaggerated for clarity.

Furthermore, in the following description, dividing names of components into first, second, and the like is to divide the names because the names of the components are the same as each other and an order thereof is not particularly limited.

Furthermore, unless explicitly described to the contrary, the word "comprise" and variations such as "comprises" or "comprising", will be understood to imply the inclusion of stated elements but not the exclusion of any other elements.

Furthermore, each of terms, such as ." . . . unit", ." . . . means", ." . . . part", and ." . . . member" described in the specification, mean a unit of a comprehensive element that performs at least one function or operation.

Figure 2:
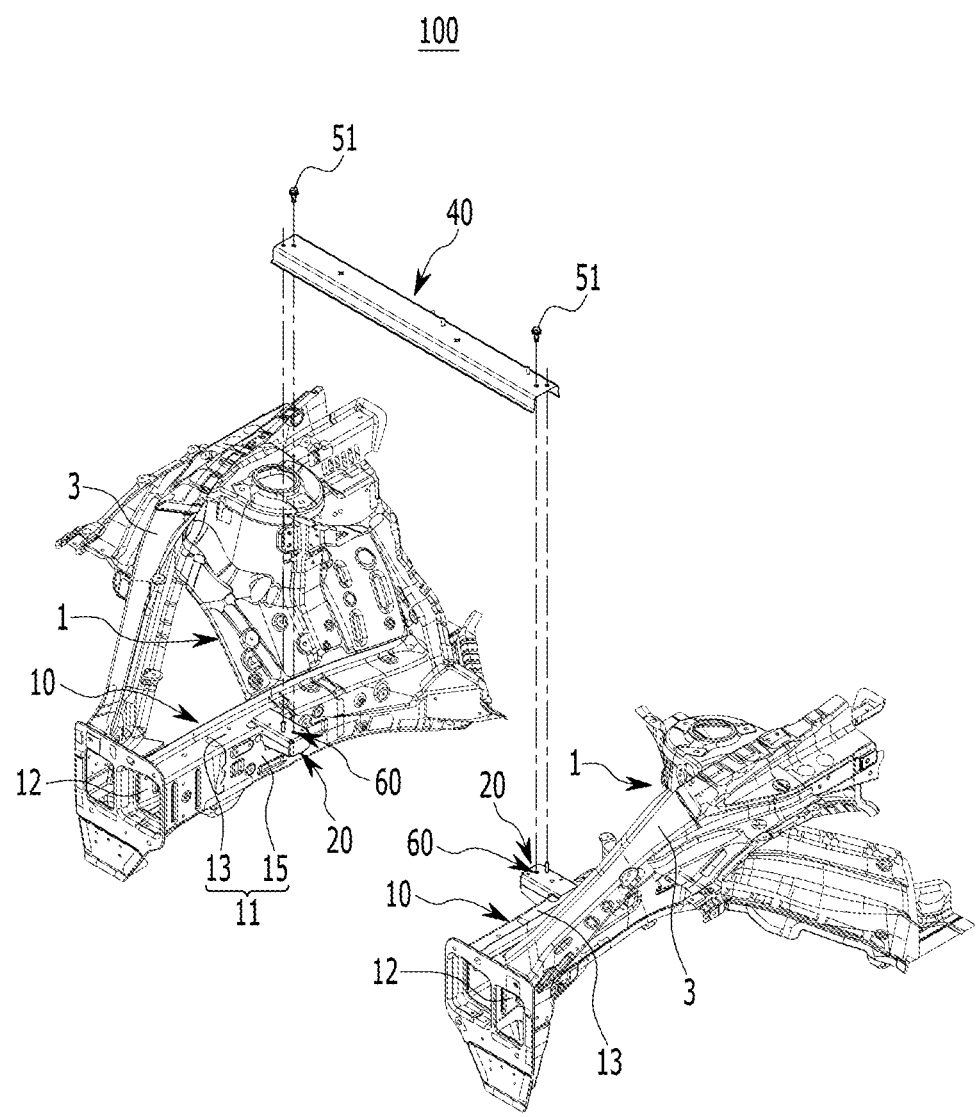
FIG. 2 is a partially exploded perspective view of a front vehicle-body structure according to an exemplary embodiment of the present invention.

FIG. 1 is a perspective view of a front vehicle-body structure according to an exemplary embodiment of the present invention. FIG. 2 is a partially exploded perspective view of a front vehicle-body structure according to an exemplary embodiment of the present invention.

Referring to FIG. 1 and FIG. 2, a front vehicle-body structure 100 according to an exemplary embodiment of the present invention is applied to a front body structure of a passenger vehicle, and may also be applied to a front body structure of an electric vehicle having a trunk in a front, which is frequently called a frunk.

In various exemplary embodiments of the present invention, the front vehicle-body structure 100 may mount various portions for driving a drive motor of an electric vehicle, for example, a wiring harness and a high voltage electric unit, and may also mount a structure body such as a front trunk.

In the present disclosure, an exemplary embodiment of the present invention is described with reference to a width direction of the vehicle, a vehicle length direction thereof, and a vehicle height direction thereof.

Furthermore, hereinafter, an "end (one end portion, another end portion, and the like)" may be defined as any one end portion or may be defined as a portion (one end portion, another end portion, and the like) including that end portion.

A front vehicle-body structure 100 according to various exemplary embodiments of the present invention includes a front side member 10 mounted at left and right sides of a vehicle body along the vehicle length direction thereof, a fender apron 1 mounted on the front side member 10, and a fender apron upper member 3 mounted on an upper end portion of the fender apron 1 and connected to the front side member 10.

Such a basic scheme of a front body structure is known in the art, and is not described in further detail.

Here, the front side member 10 includes an internal panel 11 and an external panel 12, where the term "internal" means an internal side between the front side members 10 along the width direction of the vehicle.

The front vehicle-body structure 100 according to an exemplary embodiment of the present invention is structured such that cost and weight may be reduced, supporting strength of vehicle components mounted on the front vehicle-body may be secured, and degree of freedom in assembly may be increased.

Figure 3:
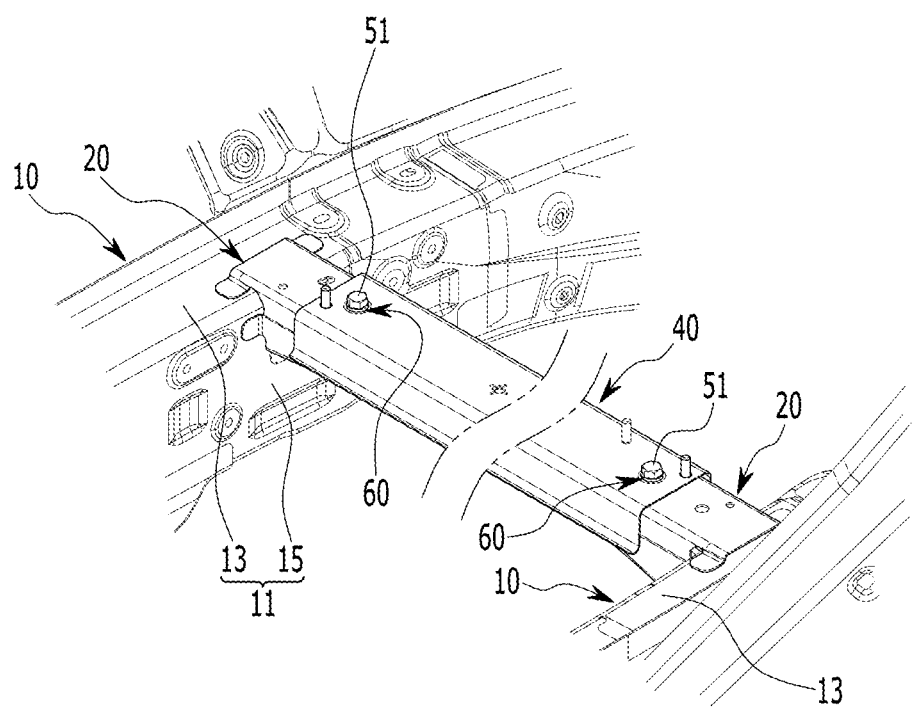
FIG. 3 illustrates a mounting structure of a mounting bracket and a cross bar applied to a front vehicle-body structure according to an exemplary embodiment of the present invention.
Figure 4:
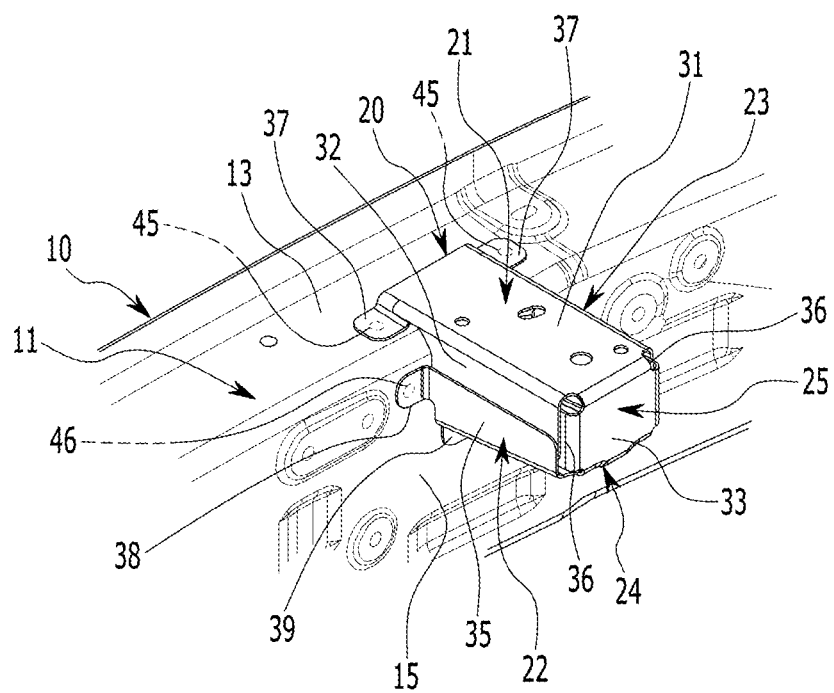
FIG. 4, FIG. 5, FIG. 6 and FIG. 7 respectively illustrate a mounting bracket applied to a front vehicle-body structure according to an exemplary embodiment of the present invention.
Figure 5:
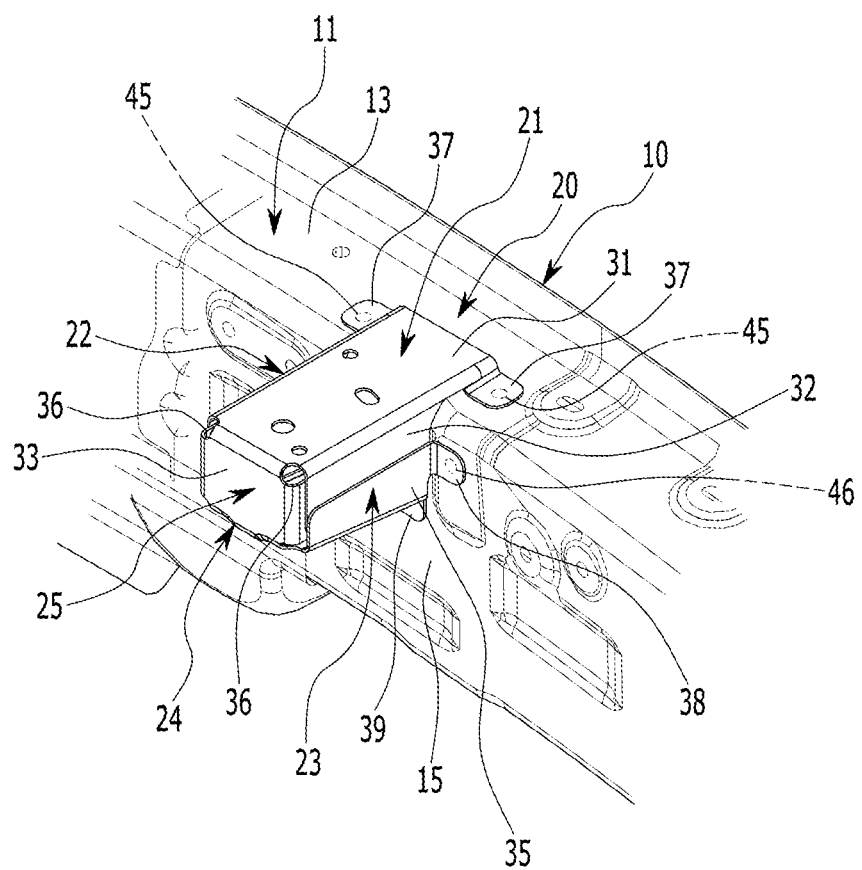
Figure 6:
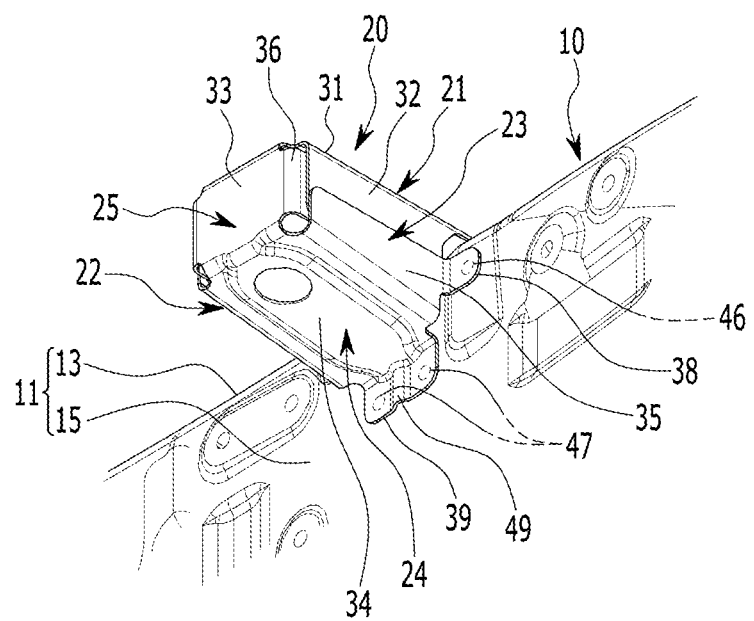
Figure 7:
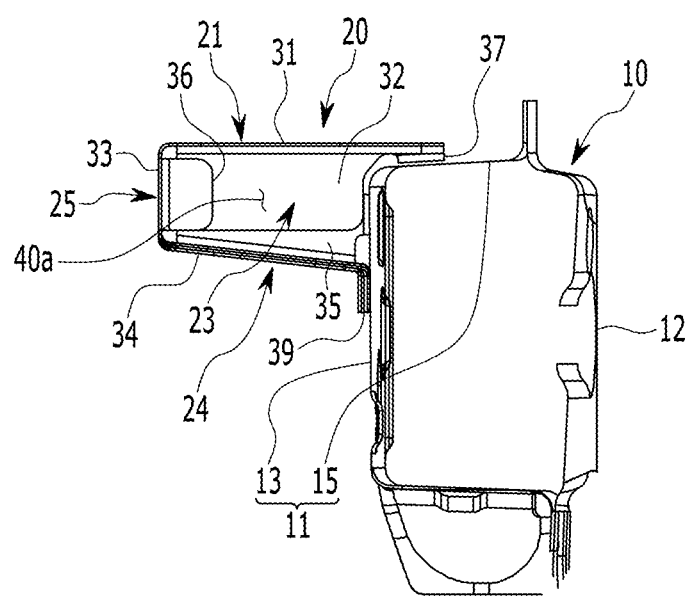

FIG. 3 illustrates a mounting structure of a mounting bracket and a cross bar applied to a front vehicle-body structure according to an exemplary embodiment of the present invention.

Referring to FIG. 1 to FIG. 3, a front vehicle-body structure 100 according to various exemplary embodiments of the present invention includes mounting brackets 20, a cross bar 40, and engagement units 60.

In various exemplary embodiments of the present invention, the mounting bracket 20 is employed to mount the cross bar 40 in the width direction of the vehicle between the front side members 10.

The mounting brackets 20 are engaged with the front side member 10, and are disposed to protrude from the internal panels 11 of the front side member 10 in the width direction of the vehicle to face each other.

FIG. 4, FIG. 5, FIG. 6 and FIG. 7 respectively illustrate a mounting bracket applied to a front vehicle-body structure according to an exemplary embodiment of the present invention.

Referring to FIG. 3, FIG. 4, FIG. 5, FIG. 6, and FIG. 7, each of the pair of mounting brackets 20 according to various exemplary embodiments of the present invention includes an upper surface 21, a front surface 22, a rear surface 23, a lower surface 24, and a side surface 25, where the side surfaces 25 of the mounting brackets 20 face each other. The mounting bracket 20 is conjoined to an internal upper surface 13 and an internal side surface 15 of the front side member 10.

In more detail, the mounting bracket 20 includes an upper surface portion 31, a first bent surface portion 32, a side surface portion 33, a lower surface portion 34, a second bent surface portion 35, a reinforcement rib 36, a first junction flange 37, a second junction flange 38, and a third junction flange 39.

The upper surface portion 31 forms the upper surface 21 of the mounting bracket 20 such that the upper surface 21 is substantially parallel to the internal upper surface 13 of the front side member 10. Hereinafter, the term "first side" means the side away from the internal side surface 15 of the front side member 10 in the width direction of the vehicle, and the term "second side" means a side toward the internal side surface 15.

The first bent surface portion 32 is formed by bending downward forward and rearward sides of the upper surface portion 31. The side surface portion 33 is formed by bending downward a first side of the upper surface portion 31, and forms the side surface 25 of the mounting bracket 20.

The lower surface portion 34 is formed by bending the side surface portion 33 in the width direction of the vehicle, to correspond to the upper surface portion 31, and forms the lower surface 24 of the mounting bracket 20. Furthermore, the second bent surface portion 35 is formed by bending upward at forward and rearward sides of the lower surface portion 34, and partially overlaps with the first bent surface portion 32. At the instant time, the second bent surface portion 35 partially overlaps with the first bent surface portion 32 with the first bent surface portion 32 inside.

Here, the first bent surface portion 32 and the second bent surface portion 35 partially overlap with each other, and form the front surface 22 and the rear surface 23 of the mounting bracket 20. Furthermore, the overlapping portions of the first bent surface portion 32 and the second bent surface portion 35 may be bonded, for example, through a structural adhesive, or may be welded.

The reinforcement rib 36 is configured to reinforce the first bent surface portion 32 and the second bent surface portion 35 overlapping with each other. The reinforcement rib 36 is formed by bending forward and rearward sides of the side surface portion 33 toward the first bent surface portion 32 along the width direction of the vehicle, and overlaps with the first bent surface portion 32.

The mounting bracket 20 forms a closed section 40a of which a cross-section gradually decreases from one front side member 10 toward the other (i.e., opposite) front side member 10. By forming the closed section 40a, a load applied to the mounting bracket 20 may be easily distributed to the front side member 10.

The first junction flange 37 extends forward and rearward from a second side of the upper surface portion 31, and is conjoined to the internal upper surface 13 of the front side member 10. The first junction flange 37 is spot-welded to the internal upper surface 13 of the front side member 10. Accordingly, a first spot welding portion 45 is formed in the first junction flange 37.

The second junction flange 38 is formed by bending the second bent surface portion 35 forward and rearward thereof, and is conjoined to the internal side surface 15 of the front side member 10. The second junction flange 38 is spot-welded to the internal side surface 15 of the front side member 10. Accordingly, a second spot welding portion 46 is formed in the second junction flange 38.

Furthermore, the third junction flange 39 is formed by bending the lower surface portion 34 downward, and is conjoined to the internal side surface 15 of the front side member 10. The third junction flange 39 is spot-welded to the internal side surface 15 of the front side member 10, below the second junction flange 38. Accordingly, a third spot welding portion 47 is formed in the third junction flange 39.

Here, the third junction flange 39 is bent downward at an end portion of the lower surface portion 34, with a width corresponding to a width of the lower surface portion 34, and forms a curved protrusion 49 at a center portion. Accordingly, the third spot welding portion 47 is formed on both sides of the curved protrusion 49 interposed therebetween. The curved protrusion 49 may easily distribute the load applied to the upper surface portion 31 to the internal side surface 15 of the front side member 10, and furthermore, may be configured for reinforcing the lower surface portion 34 of the mounting bracket 20.

Referring to FIG. 1 to FIG. 3, in various exemplary embodiments of the present invention, the cross bar 40 is configured to mount various components such as a wiring harness, a high voltage electric unit, a front trunk structure body to the front vehicle-body, and is coupled to the mounting bracket 20. The cross bar 40 may be made of steel material, and is conjoined to the mounting bracket 20 in a top-down manner along the height direction of the vehicle thereof.

Figure 8:
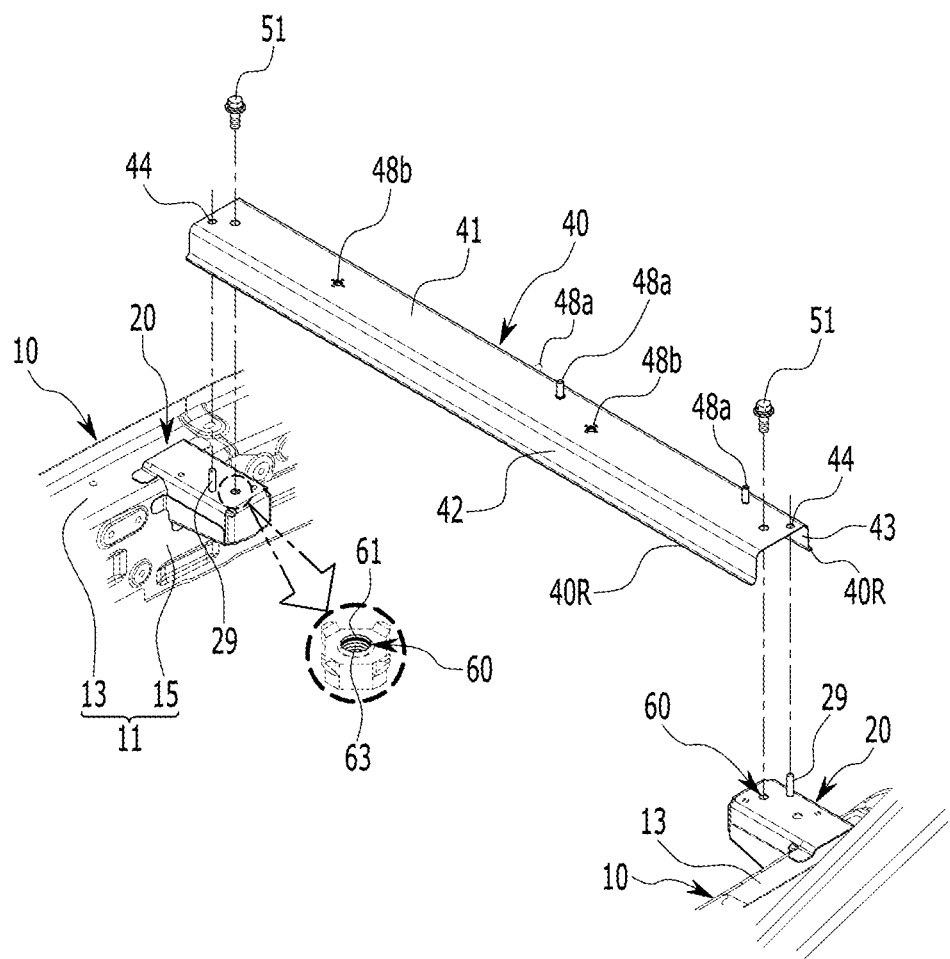
FIG. 8 illustrates a mounting structure of a cross bar in a front vehicle-body structure according to an exemplary embodiment of the present invention.
Figure 9:
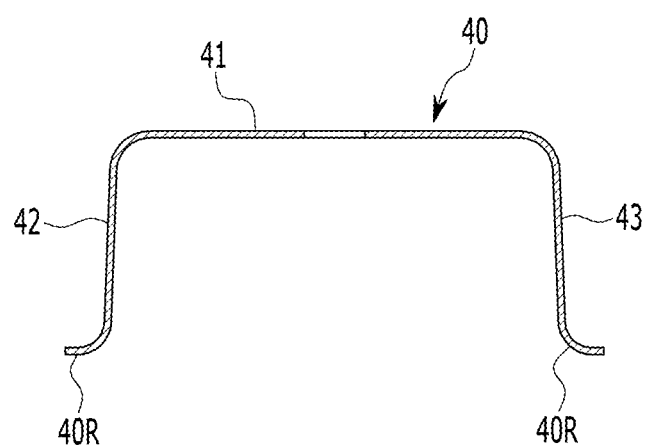
FIG. 9 illustrates a cross-sectional view of a cross bar according to an exemplary embodiment of the present invention.

FIG. 8 illustrates a mounting structure of a cross bar in a front vehicle-body structure according to an exemplary embodiment of the present invention. FIG. 9 illustrates a cross-sectional view of a cross bar according to an exemplary embodiment of the present invention.

Referring to FIG. 8 and FIG. 9, the cross bar 40 according to various exemplary embodiments of the present invention includes an upper surface 41, a front surface 42, and a rear surface 43, and may have a cross-section form having an open bottom side and open lateral ends.

The cross bar 40 forms round portions 40R bent to be round in an outward direction (that is, forward from the front surface and rearward from the rear surface) at bottom portions of the front surface 42 and the rear surface 43. In various exemplary embodiments of the present invention, the cross-section of the cross bar 40 may be maximized by the round portion 40R.

Furthermore, the cross bar 40 includes at least one weld stud bolt 48a and at least one weld stud nut 48b, to mount various parts.

The weld stud bolt 48a is welded to the upper surface 41 of the cross bar 40 in the height direction of the vehicle. Furthermore, the weld stud nut 48b is welded to an edge portion of a hole provided on the upper surface 41, from an internal side between the front surface 42 and the rear surface 43 of the cross bar 40.

Meanwhile, an end portion of the cross bar 40 is coupled to a predetermined position of the mounting bracket 20 in the height direction of the vehicle. For the present purpose, in various exemplary embodiments of the present invention, the cross bar 40 further includes a guide stud 29 which is fixed to the upper surface 21 of the mounting bracket 20 in the height direction of the vehicle.

The guide stud 29 is for mounting the cross bar 40 at a predetermined position between the front side members 10 through the mounting bracket 20, and is configured to regulate the position of the cross bar 40.

The guide stud 29 is welded to the upper surface portion 31 of the mounting bracket 20 in the height direction of the vehicle. The guide stud 29 is coupled to a guide hole 44 provided on the upper surface 41 of the cross bar 40, in the height direction of the vehicle.

Accordingly, in various exemplary embodiments of the present invention, the cross bar 40 is coupled to the mounting bracket 20 in the downward direction from above the mounting bracket 20, and both the end portions of the cross bar 40 may be coupled to the predetermined position of the mounting bracket 20 as the guide stud 29 is inserted into the guide hole 44 of the cross bar 40.

Here, the predetermined position between the front side members 10 means a position where the cross bar 40 is coupled to the mounting bracket 20 with a predetermined gap between both end portions of the cross bar 40 and the internal side surfaces 15 of the front side members 10.

Referring to FIG. 1 to FIG. 3, in various exemplary embodiments of the present invention, the engagement unit 60 is for engaging the cross bar 40 to the mounting bracket 20 by a bolt 51 with the predetermined gap between both the end portions of the cross bar 40 and the internal side surfaces 15 of the front side members 10. The engagement unit 60 is provided on the mounting bracket 20.

Figure 10:
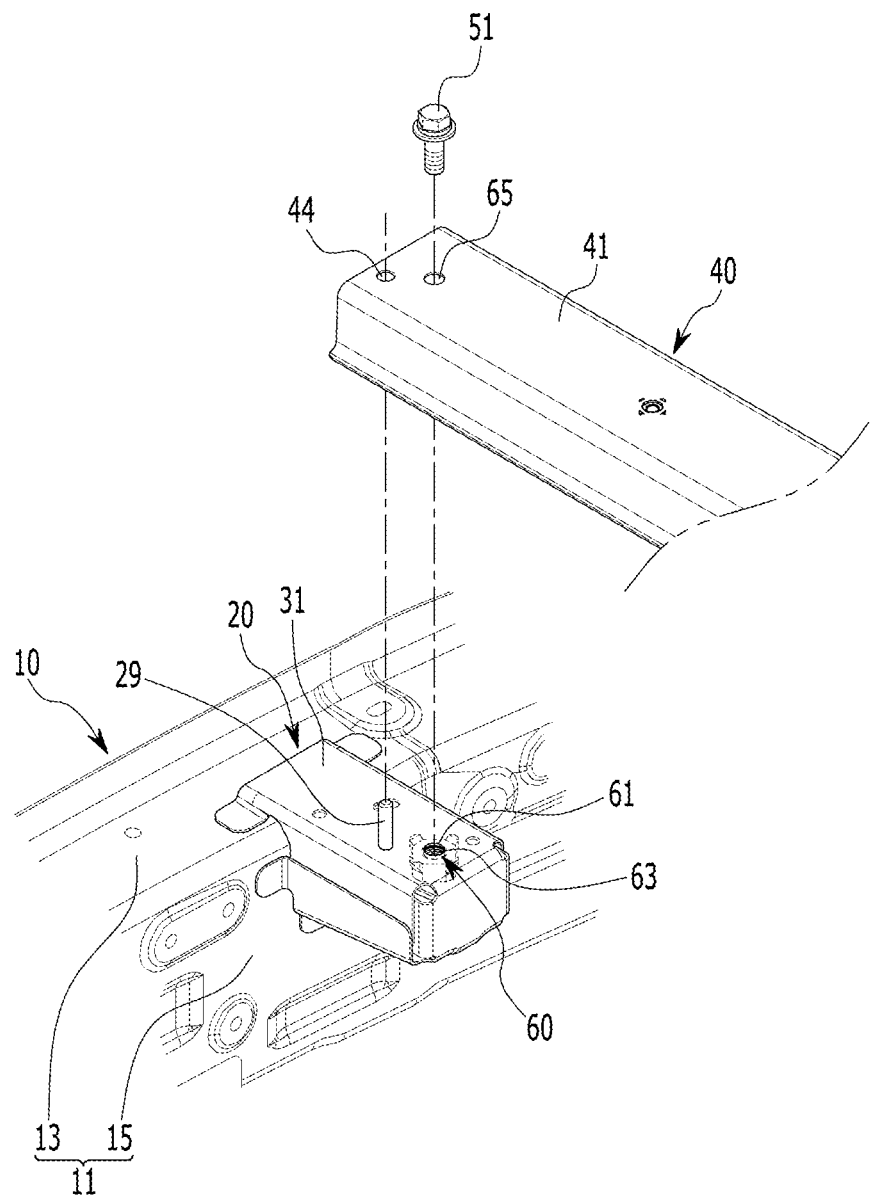
FIG. 10, FIG. 11, and FIG. 12 illustrate an engagement structure of a mounting bracket and a cross bar applied to a front vehicle-body structure according to an exemplary embodiment of the present invention.
Figure 11:
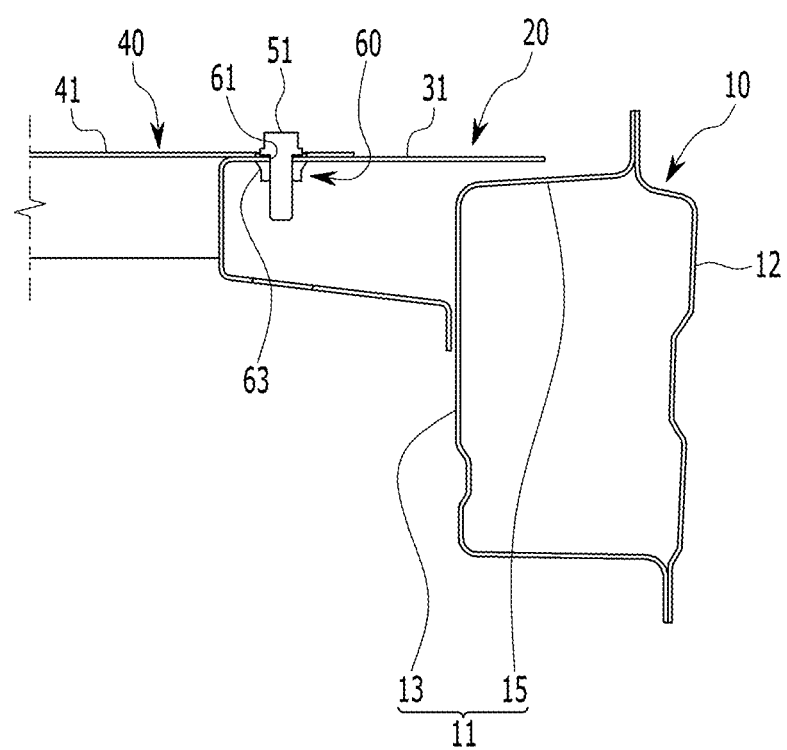
Figure 12:
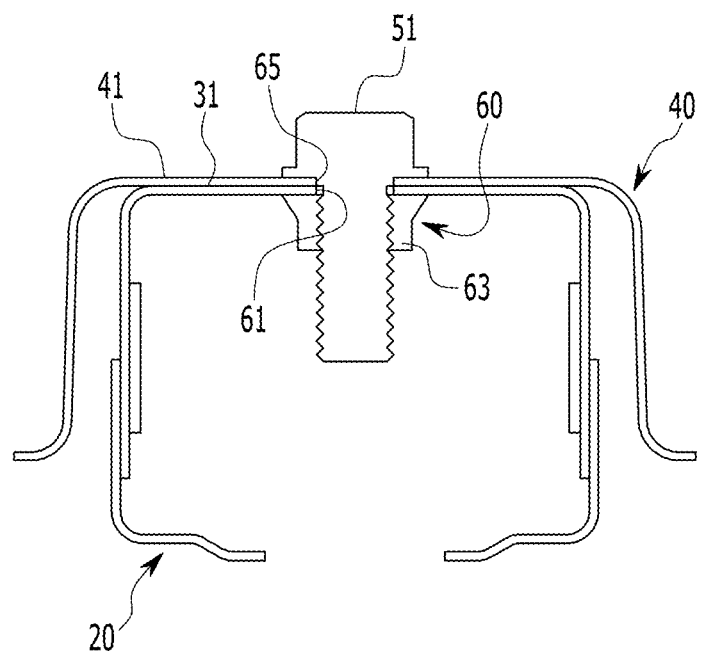
Figure 13A:
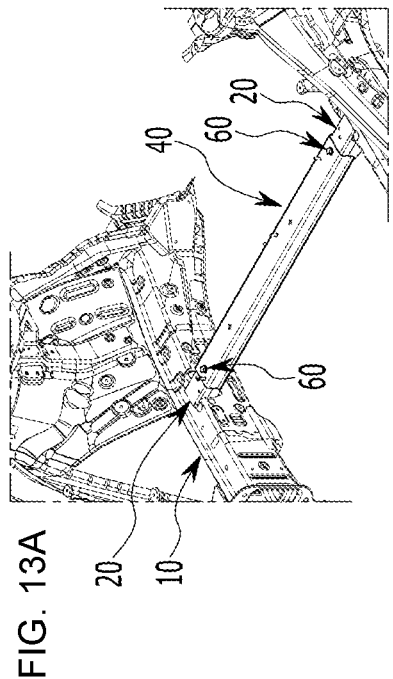
FIG. 13A, FIG. 13B, FIG. 13C and FIG. 13D illustrate a mounting structure of a vehicle component of a front vehicle-body structure according to an exemplary embodiment of the present invention.
Figure 13B:
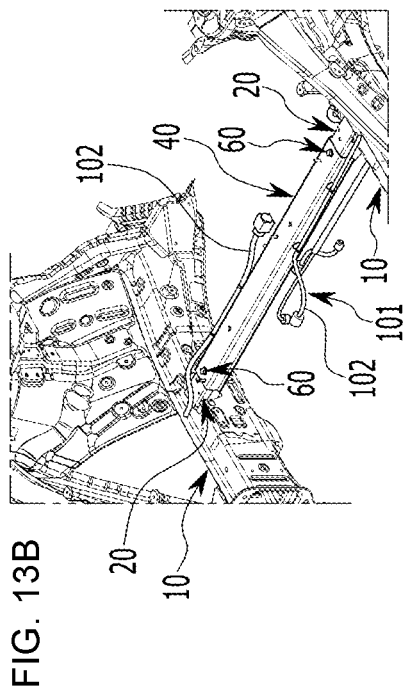
Figure 13C:
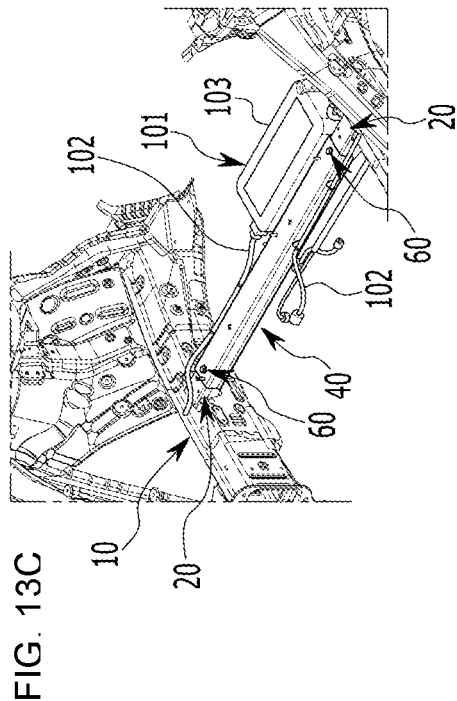
Figure 13D:
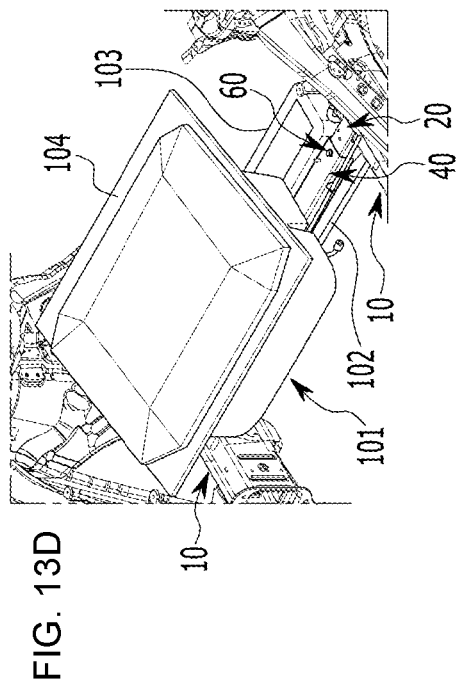

FIG. 10, FIG. 11, and FIG. 12 illustrate an engagement structure of a mounting bracket and a cross bar applied to a front vehicle-body structure according to an exemplary embodiment of the present invention.

Referring to FIG. 10, FIG. 11, and FIG. 12, the engagement unit 60 according to various exemplary embodiments of the present invention includes an engagement hole 61 formed on the upper surface portion 31 of the mounting bracket 20 and a weld nut 63 conjoined to an edge portion of the engagement hole 61 from an internal side of the mounting bracket 20.

The bolt 51 is engaged with the weld nut 63 through the upper surface 41 of the cross bar 40 and the engagement hole 61, and thereby both the end portions of the cross bar 40 may be engaged with the mounting bracket 20. Both the end portions of the cross bar 40 are respectively formed with a bolt engagement hole 65 aligned with the weld nut 63 through the engagement hole 61.

Hereinafter, an assembling process and an operation of a front vehicle-body structure according to an exemplary embodiment of the present invention is described in detail reference to the drawings.

First, in various exemplary embodiments of the present invention, the vehicle body is transferred to an assembling position in the assembly line, and the mounting brackets 20 are mounted (conjoined) to the front side member 10 in a direction facing each other along the width direction of the vehicle. Here, the mounting bracket 20 protrudes from the internal panel 11 of the front side member 10 in the width direction of the vehicle toward an opposite mounting bracket 20.

In such a state, in various exemplary embodiments of the present invention, various assembly components are mounted to the front side member 10, the fender apron 1, and the fender apron upper member 3. During the present process, since there is no obstruction to the movement of the worker in the space between the front side members 10, various assembly components may be mounted on the front side members 10, the fender aprons 1, and the fender apron upper members 3 in a convenient working posture.

Subsequently, in various exemplary embodiments of the present invention, the both the end portions of the cross bar 40 having a cross-section form having an open bottom side is coupled to the mounting bracket 20 in the downward direction from above the mounting bracket 20. At the instant time, in various exemplary embodiments of the present invention, the guide holes 44 at both the end portions of the cross bar 40 are fitted to the guide studs 29 of the mounting bracket 20, and accordingly, the cross bar 40 is coupled to the predetermined position of the mounting bracket 20.

Accordingly, in various exemplary embodiments of the present invention, the cross bar 40 is coupled with the mounting bracket 20 with the predetermined gap between both the end portions of the cross bar 40 and the internal side surfaces 15 of the front side members 10.

Accordingly, the cross bar 40 is placed over the mounting bracket 20 with placing through both end portions, and the bolt engagement hole 65 at both the end portions of the cross bar 40 coincides with the weld nut 63 through the engagement hole 61 of the mounting bracket 20.

Subsequently, in various exemplary embodiments of the present invention, the bolt 51 is engaged with the weld nut 63 through the bolt engagement hole 65 and the engagement hole 61. Accordingly, the both the end portions of the cross bar 40 are engaged with the mounting brackets 20 by the bolts 51.

Accordingly, in various exemplary embodiments of the present invention, the cross bar 40 is engaged with the mounting bracket 20 with the predetermined gap between both the end portions of the cross bar 40 and the internal side surfaces 15 of the front side members 10. Therefore, in various exemplary embodiments of the present invention, even if the cross bar 40 is assembled after assembly components are assembled to the front vehicle-body, there may be less interference between the assembly components and a fastening tool.

Therefore, in various exemplary embodiments of the present invention, since it is not necessary to assemble the cross bar 40 prior to assembly components to avoid the interference between assembly components and the fastening tool, disturbance in the worker's movement line and inconvenience of working posture due to the prior assembly of the cross bar 40 may be prevented.

While the cross bar 40 is engaged with the mounting bracket 20 in advance, in various exemplary embodiments of the present invention, as shown in FIG. 13A, FIG. 13B, FIG. 13C and FIG. 13D, various vehicle components 101 such as a wiring harness 102, a high voltage electric unit 103, and a front trunk structure body 104 are mounted to the cross bar 40.

Here, the vehicle components 101 may be mounted to the cross bar 40 by the weld stud bolt 48a and the weld stud nut 48b provided on the cross bar 40.

Therefore, in various exemplary embodiments of the present invention, the cross-section of the cross bar 40 may be maximized by the round portion 40R, the strength of the mounting bracket 20 may be reinforced by the closed section 40a, the reinforcement rib 36, the curved protrusion 49, and the like of the mounting bracket 20, and the load applied to the mounting bracket 20 may be distributed to the front side member 10.

Accordingly, in various exemplary embodiments of the present invention, enough strength of the cross bar 40 to stably support various vehicle components 101 may be secured, an impact at a vehicle collision may be absorbed and distributed through the cross bar 40, and vehicle behavior in the width direction of the vehicle at a small overlap collision may be improved.

According to the front vehicle-body structure 100 according to various exemplary embodiments of the present invention, since the cross bar 40 may be mounted irrespective of the assemble order of assembly components assembled to the front vehicle-body, the degree of freedom in assembling vehicle components may be increased in setting a package layout.

Furthermore, in various exemplary embodiments of the present invention, by applying the cross bar 40 of steel material having a cross-section form having an open bottom side, instead of a relatively expensive aluminum extruded material, cost and weight may be reduced.

Figure 14:
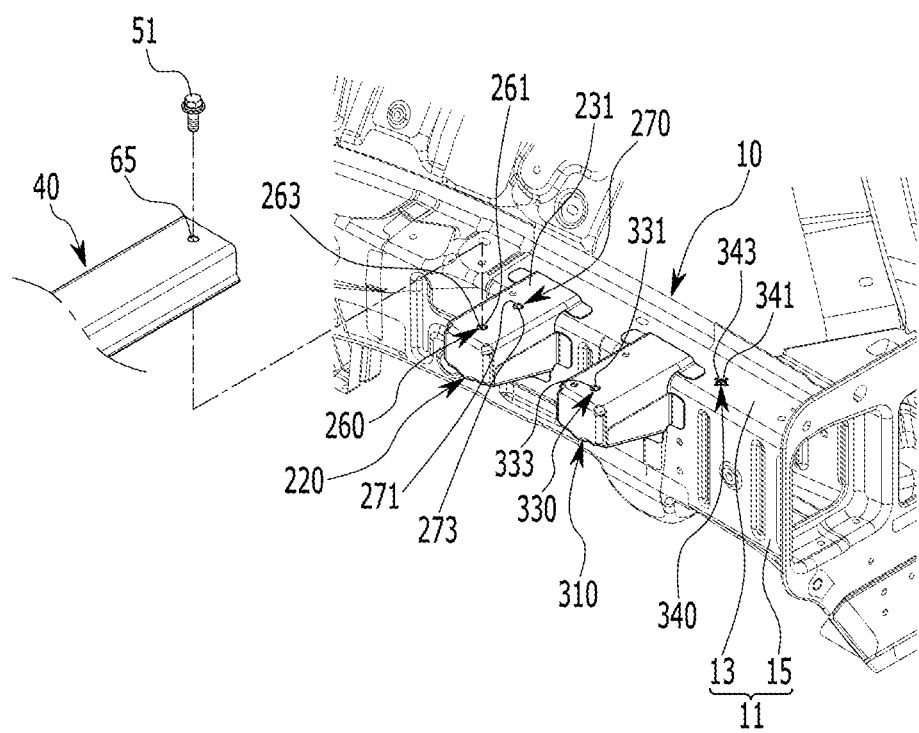
FIG. 14 illustrates a front vehicle-body structure according to another exemplary embodiment of the present invention.
Figure 15:
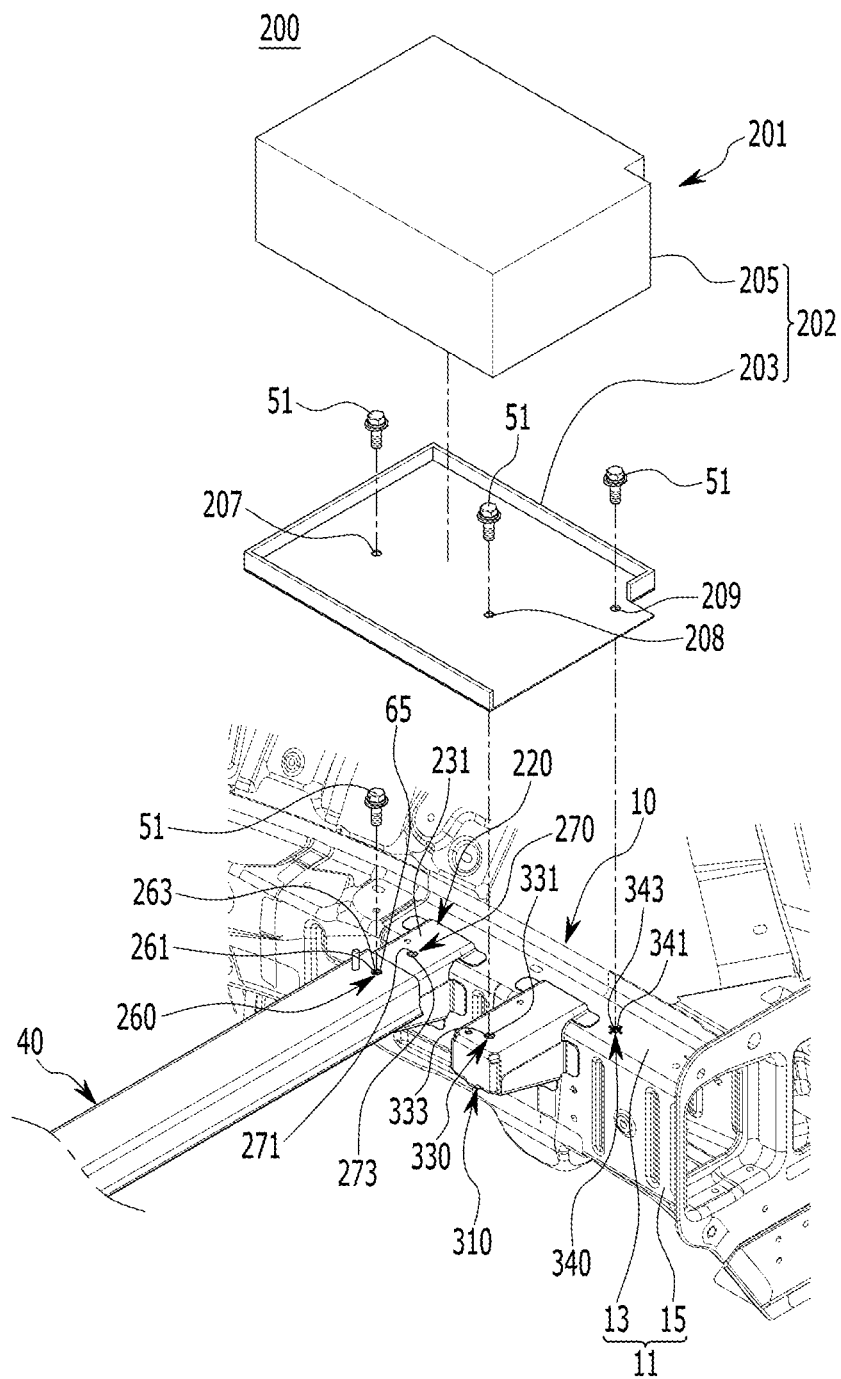
FIG. 15 illustrates a mounting structure of a vehicle component of a front vehicle-body structure according to another exemplary embodiment of the present invention.

FIG. 14 illustrates a front vehicle-body structure according to another exemplary embodiment of the present invention. FIG. 15 illustrates a mounting structure of a vehicle component of a front vehicle-body structure according to another exemplary embodiment of the present invention. In the drawings, a same element as in the previous exemplary embodiment of the present invention is provided with same drawing number.

Referring to FIG. 14 and FIG. 15, a front vehicle-body structure 200 according to another exemplary embodiment of the present invention is structured, based on the structure of the previous exemplary embodiment of the present invention such that a battery assembly 202 as a vehicle component 201 may be mounted to the front vehicle-body while being supported by the cross bar 40.

Here, the battery assembly 202 includes a battery tray 203 fixed to the front vehicle-body and an auxiliary battery 205 of 12V fixed to the battery tray 203.

The front vehicle-body structure 200 according to another exemplary embodiment includes the cross bar 40 as in the previous exemplary embodiment of the present invention, and further includes a first mounting bracket 220, a first engagement unit 260, a second engagement unit 270, a second mounting bracket 310, a third engagement unit 330, and a fourth engagement unit 340.

In various exemplary embodiments of the present invention, the first mounting bracket 220 is a bracket structure having the same shape and cross-section as the mounting bracket 20 of the previous exemplary embodiment of the present invention, and is conjoined to the front side member 10.

In various exemplary embodiments of the present invention, the first engagement unit 260 is for engaging both the end portions of the cross bar 40 with the first mounting bracket 220, with a predetermined gap between the front side member 10 and the lateral end portion of the cross bar 40, and is provided on an upper surface 231 of the first mounting bracket 220. The first engagement unit 260 includes a first engagement hole 261 and a first weld nut 263 that are formed to the same as in the engagement unit 60 of the previous exemplary embodiment of the present invention.

Here, the both the end portions of the cross bar 40 may be engaged with the first mounting bracket 220 as the bolt 51 is engaged with the first weld nut 263 through the first engagement hole 261 and the bolt engagement hole 65 provided in both the end portions of the cross bar 40.

The first engagement unit 260 is formed to the same as the engagement unit of the previous exemplary embodiment of the present invention, and is not described in further detail.

In various exemplary embodiments of the present invention, the second engagement unit 270, together with the first engagement unit 260, is provided on the first mounting bracket 220 such that the battery tray 203 of the battery assembly 202 may be mounted on the cross bar 40.

The second engagement unit 270 is disposed apart from the first engagement unit 260 on the upper surface 231 of the first mounting bracket 220, disposed between the end portion of the cross bar 40 and the internal side surface 15 of the front side member 10, and engaged with the battery tray 203 by the bolt 51. The second engagement unit 270 includes a second engagement hole 271 and a second weld nut 273, to engage the battery tray 203 with the first mounting bracket 220.

The second engagement hole 271 is formed on the upper surface 231 of the first mounting bracket 220. The second weld nut 273 is conjoined with an edge portion of the second engagement hole 271 from an internal side of the first mounting bracket 220, and is aligned with a bolt engagement hole 207 provided in the battery tray 203 through the second engagement hole 271.

Here, the battery tray 203 may be engaged with the first mounting bracket 220 as the bolt 51 is engaged with the second weld nut 273 through the second engagement hole 271 and the bolt engagement hole 207 of the battery tray 203.

In various exemplary embodiments of the present invention, the second mounting bracket 310 is for mounting the battery tray 203 of the battery assembly 202 on the cross bar 40, and is engaged with the front side member 10 with a predetermined gap in the vehicle length direction with respect to the first mounting bracket 220.

The second mounting bracket 310 protrudes from the internal panel 11 of the front side member 10 in the width direction of the vehicle toward an opposite second mounting bracket 310. The second mounting bracket 310 may be formed to the same as the mounting bracket 20 of the previous exemplary embodiment of the present invention, in a bracket structure having the same shape and cross-section as the first mounting bracket 220, and is conjoined with the front side member 10.

In various exemplary embodiments of the present invention, the third engagement unit 330 is provided on an upper surface of the second mounting bracket 310, to mount the battery tray 203 of the battery assembly 202 on the cross bar 40.

The third engagement unit 330 is engaged with the battery tray 203 by the bolt 51, and includes a third engagement hole 331 and a third weld nut 333, to engage the battery tray 203 with the second mounting bracket 310.

The third engagement hole 331 is formed on the upper surface of the second mounting bracket 310. The third weld nut 333 is conjoined with an edge portion of the third engagement hole 331 from an internal side of the second mounting bracket 310, and is aligned with a bolt engagement hole 208 provided in the battery tray 203 through the third engagement hole 331.

Here, the battery tray 203 may be engaged with the second mounting bracket 310 as the bolt 51 is engaged with the third weld nut 333 through the third engagement hole 331 and the bolt engagement hole 208 of the battery tray 203.

In various exemplary embodiments of the present invention, the fourth engagement unit 340 is provided in the front side member 10, to mount the battery tray 203 of the battery assembly 202 on the cross bar 40.

The fourth engagement unit 340 is provided on the internal upper surface 13 of the front side member 10, and engaged with the battery tray 203 by the bolt 51. The fourth engagement unit 340 includes a fourth engagement hole 341 and a fourth weld nut 343, to engage the battery tray 203 with the internal upper surface 13 of the front side member 10.

The fourth engagement hole 341 is formed on the internal upper surface 13 of the front side member 10. The fourth weld nut 343 is conjoined with an edge portion of the fourth engagement hole 341 from an internal side of the front side member 10, and is aligned with a bolt engagement hole 209 provided in the battery tray 203 through the fourth engagement hole 341.

Here, the battery tray 203 may be engaged with the internal upper surface 13 of the front side member 10 as the bolt 51 is engaged with the fourth weld nut 343 through the fourth engagement hole 341 and the bolt engagement hole 209 of the battery tray 203.

Therefore, according to the front vehicle-body structure 200 according to another exemplary embodiment of the present invention, a sufficient strength for supporting the battery assembly 202 mounted on the first mounting bracket 220, the second mounting bracket 310, and the front side member 10 may be secured through the cross bar 40.

Remaining configuration and operation and effect of the front vehicle-body structure 200 according to another exemplary embodiment of the present invention is the same as the previous exemplary embodiment of the present invention, and is not described in further detail.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A front vehicle-body structure, comprising:
   a pair of front side members each disposed in a longitudinal direction of a vehicle at both sides of a front vehicle-body;
   a pair of mounting brackets each engaged with a corresponding front side member among the pair of front side members and disposed to protrude from an internal panel of the corresponding front side member in a width direction of the vehicle to face each other;
   a cross bar having an upper surface, a front surface, and a rear surface, having a cross-section having an open bottom side and an open lateral end portion, and engaged with the pair of mounting brackets in a height direction of the vehicle; and
   an engagement unit of engaging the cross bar to the pair of mounting brackets with a predetermined gap between the pair of front side members and the open lateral end portion of the cross bar,
   wherein each of the pair of mounting brackets includes an upper surface, a front surface, a rear surface, a lower surface, and side surfaces, where the side surfaces of the mounting brackets face each other, and
   wherein the pair of mounting brackets is conjoined to an upper surface and an internal side surface of the pair of front side members.

2. The front vehicle-body structure of claim 1, further including a guide stud which is fixed to the upper surface of the pair of mounting brackets in the height direction of the vehicle and configured to be coupled to a guide hole provided on the upper surface of the cross bar, in the height direction of the vehicle.

3. The front vehicle-body structure of claim 1, wherein each mounting bracket in the pair of mounting brackets includes:
   an upper surface portion;
   a first bent surface portion bent downwardly from forward and rearward sides of the upper surface portion;
   a side surface portion bent downwardly from a first side of the upper surface portion;
   a lower surface portion formed by bending the side surface portion in the width direction of the vehicle, to correspond to the upper surface portion; and
   a second bent surface portion formed by bending upward at forward and rearward sides of the lower surface portion, and partially overlaps with the first bent surface portion.

4. The front vehicle-body structure of claim 3, wherein each mounting bracket in the pair of mounting brackets further includes:
   a first junction flange extending forward and rearward from a second side of the upper surface portion, and conjoined to an internal upper surface of the pair of front side members;
   a second junction flange bent forward and rearward from the second bent surface portion, and conjoined to the internal side surface of the pair of front side members; and
   a third junction flange bent downwardly from the lower surface portion, and conjoined to the internal side surface of the pair of front side members.

5. The front vehicle-body structure of claim 4, wherein
   the first junction flange is spot-welded to the internal upper surface of the pair of front side members; and
   the second and third junction flanges are spot-welded to the internal side surface of the pair of front side members.

6. The front vehicle-body structure of claim 3, wherein the first bent surface portion and the second bent surface portion partially overlap with each other, and form the front surface and the rear surface of the pair of mounting brackets.

7. The front vehicle-body structure of claim 3, wherein the side surface portion includes a reinforcement rib which is formed by bending forward and rearward sides of the side surface portion toward the first bent surface portion along the width direction of the vehicle, and overlaps with the first bent surface portion.

8. The front vehicle-body structure of claim 1, wherein the pair of mounting brackets forms a closed section of which a cross-section decreases from a front side member of the pair of front side members toward an opposite front side member of the pair of front side members.

9. The front vehicle-body structure of claim 1, wherein the cross bar is formed in a cross-section form having an open bottom side thereof.

10. The front vehicle-body structure of claim 1, wherein the cross bar forms round portions bent to be round in an outward direction at bottom portions of the front and rear surfaces of the cross bar.

11. The front vehicle-body structure of claim 1, wherein the engagement unit includes:
   an engagement hole formed on the upper surface of the pair of mounting brackets; and
   a weld nut conjoined to an edge portion of the engagement hole from an internal side of the pair of mounting brackets.

12. The front vehicle-body structure of claim 11, wherein first and second end portions of the cross bar are respectively formed with a bolt engagement hole aligned with the weld nut through the engagement hole.

13. The front vehicle-body structure of claim 1, wherein the front vehicle-body structure is configured to mount a vehicle component for an electric vehicle to the cross bar, wherein the vehicle component for the electric vehicle includes a wiring harness, an electric unit, and a front trunk structure.

14. A front vehicle-body structure, comprising:
a pair of front side members each disposed in a longitudinal direction of a vehicle at both sides of a front vehicle-body;
a pair of first mounting brackets each engaged with a corresponding front side member among the pair of front side members and disposed to protrude from an internal panel of the corresponding front side member in a width direction of the vehicle to face each other;
a cross bar having an upper surface, a front surface, and a rear surface, having a cross-section having an open bottom side and an open lateral end portion, and engaged with the pair of first mounting brackets in a height direction of the vehicle;
a first engagement unit provided on an upper surface of the pair of first mounting brackets and configured to engage the cross bar to the pair of first mounting brackets with a predetermined gap between the pair of front side members and the open lateral end portion of the cross bar;
a second engagement unit provided on at least one of the pair of first mounting brackets to mount a vehicle component to the cross bar by being engaged with the vehicle component;
a second mounting bracket which is engaged with the pair of front side members with a predetermined gap in the longitudinal direction of the vehicle with respect to the pair of first mounting brackets, and protrudes from the internal panel of the pair of front side members in the width direction of the vehicle; and
a third engagement unit provided on the second mounting bracket to mount the vehicle component to the cross bar by being engaged with the vehicle component.

15. The front vehicle-body structure of claim 14, wherein the vehicle component includes a battery assembly including a battery tray and an auxiliary battery; and
wherein the battery assembly is mounted to the cross bar through the second and third engagement units.

16. The front vehicle-body structure of claim 14, wherein the first engagement unit includes:
a first engagement hole formed on the upper surface of the pair of first mounting brackets; and
a first weld nut conjoined to an edge portion of the first engagement hole from an internal side of the pair of first mounting brackets, and aligned with a bolt engagement hole provided in the cross bar through the first engagement hole.

17. The front vehicle-body structure of claim 14,
wherein the second engagement unit includes:
a second engagement hole formed on an upper surface of the pair of first mounting brackets; and
a second weld nut conjoined to an edge portion of the second engagement hole from an internal side of the pair of first mounting brackets, and configured to be aligned with a bolt engagement hole provided in the vehicle component through the second engagement hole, and
wherein the third engagement unit includes:
a third engagement hole formed on the upper surface of the second mounting bracket; and
a third weld nut conjoined to an edge portion of the third engagement hole from an internal side of the second mounting bracket, and configured to be aligned with a bolt engagement hole provided in the vehicle component through the third engagement hole.

18. The front vehicle-body structure of claim 14, further including a fourth engagement unit provided in the pair of front side members to mount the vehicle component to the cross bar and configured to be engaged with the vehicle component.

19. The front vehicle-body structure of claim 18, wherein the fourth engagement unit includes:
a fourth engagement hole formed on an internal upper surface of the pair of front side members; and
a fourth weld nut conjoined to edge portion of the fourth engagement hole from an internal side of the pair of front side members, and configured to be aligned with a bolt engagement hole provided in the vehicle component through the fourth engagement hole.

* * * * *